(12) United States Patent
Kramer

(10) Patent No.: US 6,581,568 B2
(45) Date of Patent: Jun. 24, 2003

(54) MANUALLY GUIDED IMPLEMENT HAVING A DRIVE MOTOR

(75) Inventor: Jochen Kramer, Waiblingen (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/823,544

(22) Filed: Mar. 30, 2001

(65) Prior Publication Data

US 2001/0025624 A1 Oct. 4, 2001

(30) Foreign Application Priority Data

Apr. 1, 2000 (DE) ............................. 200 06 073

(51) Int. Cl.⁷ ................................................ F02D 1/00
(52) U.S. Cl. .................................. 123/398; 123/179.18
(58) Field of Search ............................... 123/398, 396, 123/179.18, 400; 74/501.6

(56) References Cited

U.S. PATENT DOCUMENTS

| | | | | |
|---|---|---|---|---|
| 4,302,880 A | | 12/1981 | Elfving et al. | |
| 5,685,271 A | * | 11/1997 | Taomo et al. | 123/398 |
| 5,693,264 A | * | 12/1997 | Fricke | 123/179.18 |
| 5,718,052 A | * | 2/1998 | Taomo et al. | 123/198 D |
| 5,758,546 A | * | 6/1998 | Taomo et al. | 74/488 |
| 5,765,445 A | * | 6/1998 | Miyata | 56/DIG. 18 |
| 5,862,713 A | * | 1/1999 | Tsunoda et al. | 123/398 |
| 5,868,377 A | * | 2/1999 | Taomo et al. | 123/398 |
| 6,039,024 A | * | 3/2000 | Carlson et al. | 123/396 |
| 6,202,989 B1 | * | 3/2001 | Pattullo | 123/179.18 |
| 6,209,412 B1 | * | 4/2001 | Hiratsuna et al. | 123/398 |

* cited by examiner

Primary Examiner—Erick Solis
(74) Attorney, Agent, or Firm—R W Becker & Associates; R W Becker

(57) ABSTRACT

A manually guided implement having a drive motor is provided. Control elements, such as a gas throttle and an arresting element, are pivotably disposed on a grip of the implement disposed remote from the motor. The arresting element is fixed in position on the throttle by a pivot joint, and is held in a position of rest by a spring element. The arresting element can be pivoted out of the rest position into an arresting position by the hand of an operator. The arresting position defines a starting throttle position of the gas throttle on the grip of the implement.

10 Claims, 5 Drawing Sheets

MANUALLY GUIDED IMPLEMENT HAVING A DRIVE MOTOR

BACKGROUND OF THE INVENTION

The present invention relates to a manually guided implement, having a drive motor, and a grip for guiding the implement. A gas throttle is pivotably mounted on the grip and is connected by a transmitting means to a carburetor of the drive motor. An arresting element is held on the gas throttle for the releaseable arresting of the throttle on the grip, whereby the arresting element is adjustable relative to the gas throttle.

U.S. Pat. No. 4,302,880 discloses a gas throttle having an arresting element for a motor-driven implement, namely a power chainsaw. The arresting element is rotatably mounted in the grip of the implement, and by means of finger-like dogs formed on one end thereof can be brought into engagement with the gas throttle, which is rotatably mounted on the grip. With the aid of the arresting element the gas throttle can be arrested, for example, in a starting throttle position. The arresting element is operatively connected with the gas throttle in such a way that operation of the gas throttle is precluded unless the arresting element is first actuated. Unfortunately, the structural configuration of this known arrangement is very complicated and unreliable during operation.

It is also known to embody a gas throttle of a manually guided motor-driven implement, such as a brush cutter, in such a way that it is monolithic with an arresting element, whereby the arresting element can be brought into arresting engagement with the grip of the implement by elastic deformation by the operator. In the arresting engagement, a starting throttle position of the gas throttle is provided. If the arresting position is unintentionally maintained over a long period of time, for example during the winter, the elastic restoration of the arresting element on the gas throttle is no longer ensured, for example due to material fatigue; the idling position of the gas throttle can then no longer be achieved.

It is therefore an object of the present invention to improve a manually guided implement of the aforementioned general type in such a way that the starting throttle position of the gas throttle can be easily set and can again be released in a functionally reliable manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The manually guided implement of the present invention is characterized primarily in that the arresting element is an essentially separate component from the gas throttle and is fixed in position thereon by means of a pivot joint, wherein a spring element holds the arresting element is a position of rest on the gas throttle.

In order to be able to easily bring the gas throttle into the starting position, the arresting element is rotatably held on the throttle by means of a pivot joint, whereby a spring element biases or urges the arresting element into a position of rest in which it cannot effect arrest. The arresting element is pivoted along with the gas throttle over its entirely structurally prescribed pivot range. The arresting element is advantageously provided as an extension of a grip surface or portion of the gas throttle, and can thus be easily pivoted into a position of rest by the fingers of an operating hand. In the arresting position, the arresting element is arrested on the grip of the implement. The gas throttle, which is preferably held by spring bias in an idling position, is first to be pivoted into a starting position in which the butterfly valve of the controlled carburetor is easily opened.

In the arresting position of the arresting element, an arresting recess on the free end of the arresting element is preferably in engagement with a detent on a grip of the implement.

The pivot bearing between the arresting element and the gas throttle is advantageously formed by a pivot bolt on the arresting element and a cylindrical socket on the gas throttle. In the assembled state of the arresting element, the bolt is guided in the socket. For axially securing the arresting element on the gas throttle, detents are advantageously formed on the arresting element. After mounting of the arresting element, the detents are brought into engagement with arresting grooves of the gas throttle and prevent an axial slipping apart of the pivot joint in the rest and arresting positions of the arresting element.

Instead of the pivot joint, it can be expedient to provide a film articulation between the arresting element and the gas throttle.

The arresting element is inventively held in its position of rest against a stop of the gas throttle by means of a spring element that is supported between the gas throttle and the arresting element. The spring element can be formed by a torsion spring, a helical spring, or some other suitable spring.

The gas throttle advantageously has a T-shaped configuration. One end of a short leg of the gas throttle serves for the rotatable mounting on the implement grip, while a transmitting means engages the other end of the short leg. The long leg of the gas throttle is advantageously embodied as a slightly curved gripping element against which the fingers of a hand can rest.

Further specific features of the present invention will be described in detail subsequently.

DESCRIPTION OF PREFERRED EMBODIMENTS

Figure 1:
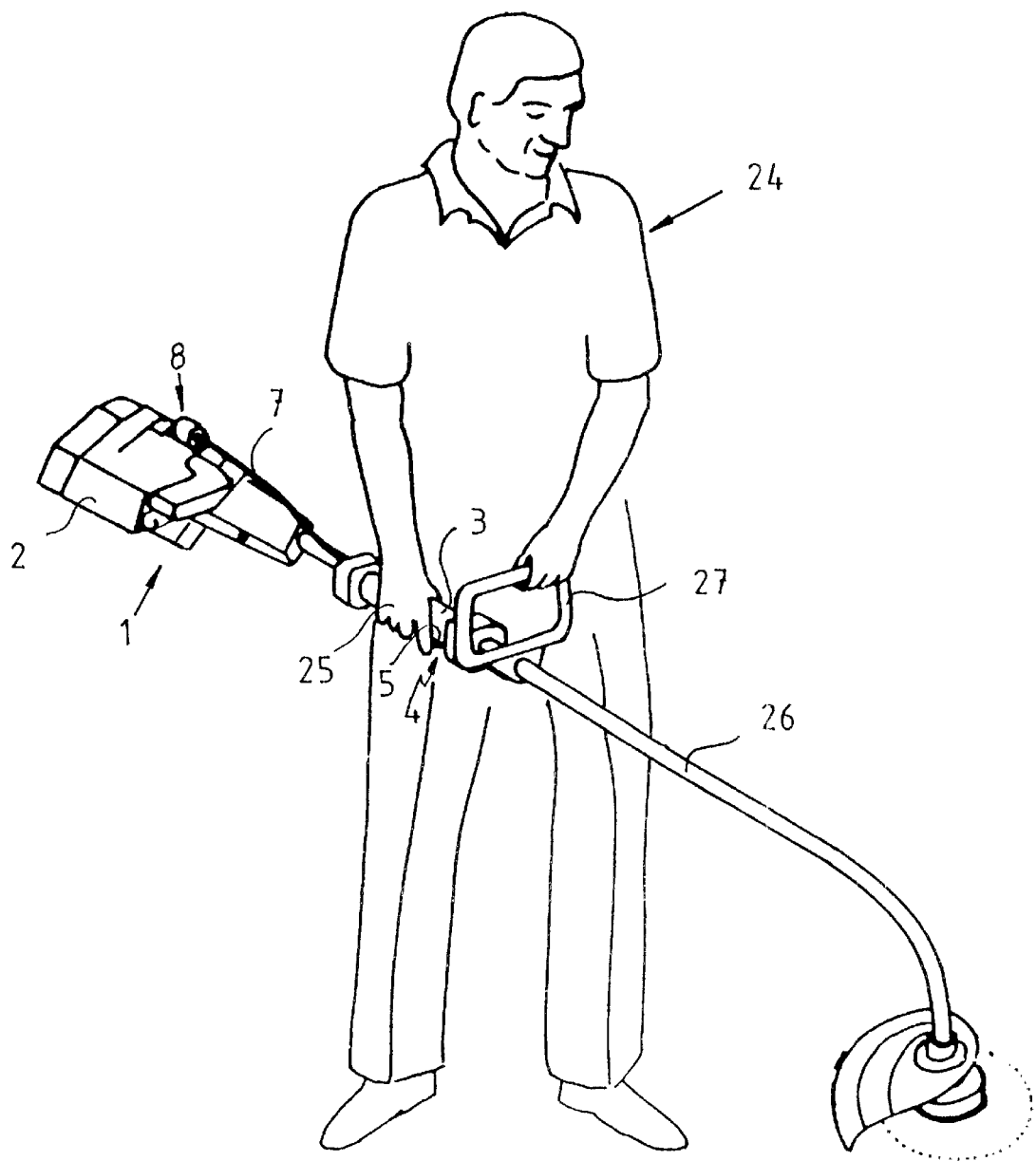
FIG. 1 is a view of a manually guided implement.

Referring now to the drawings in detail, FIG. 1 shows a manually guided implement 1 that is held by a user 24 and that in the illustrated embodiment is a brush cutter, the drive motor 2 of which is embodied as an internal combustion engine. The right hand 25 of the user 24 grasps a grip 3 that is remote from the drive motor 2 and that is coaxially disposed on a carrying or support tube 26 of the brush cutter. The implement 1 is guided by the left hand via a bracket-like handle 27 that extends transverse to the support tube 26 and is secured thereon.

Pivotably disposed on the grip 3 are control elements 4, such as a gas throttle 5. The gas throttle 5 is connected with a Bowden cable that is embodied as the transfer or transmitting means 7. In the illustrated embodiment, the Bowden cable connects the throttle 5 with a carburetor 8, and in particular with a throttle or butterfly valve 29 (see FIGS. 2–4) of the carburetor 8 on the drive motor 2.

Figure 2:
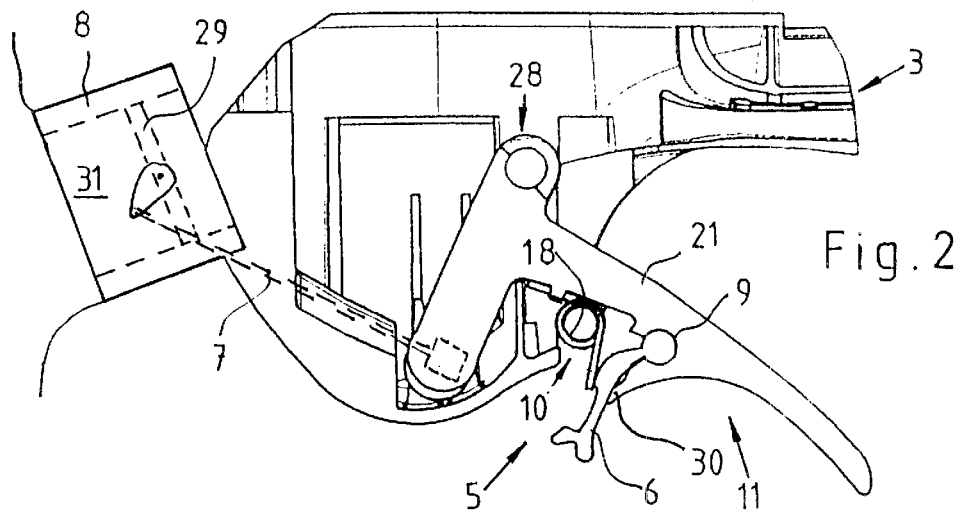
FIG. 2 is a schematic side-view of a gas throttle having an arresting element and disposed on the grip of the implement, with the throttle being in the idling position.

FIG. 2 shows a schematic side view of the gas throttle 5 with a catching or arresting element on the grip 3 of the implement 1 of FIG. 1. The position of the throttle 5 shown in FIG. 2 is in an idling position of the carburetor. One end of the throttle 5 is pivotably held in the grip 3. In the illustrated embodiment, a pivot joint 28 disposed between the throttle 5 and the grip 3 is embodied as a pivot bearing, whereby pins that project from the throttle 5 and are monolithically formed therewith are held in bearing bushings of the grip 3. At that end that faces away from the pivot joint 28, secured to the gas throttle 5 is the transmitting means 7, which as indicated above is embodied as a Bowden cable in the illustrated embodiment. This transmitting means 7 establishes a connection between the throttle 5 and the butterfly valve 29 of the carburetor 8.

Figure 11:
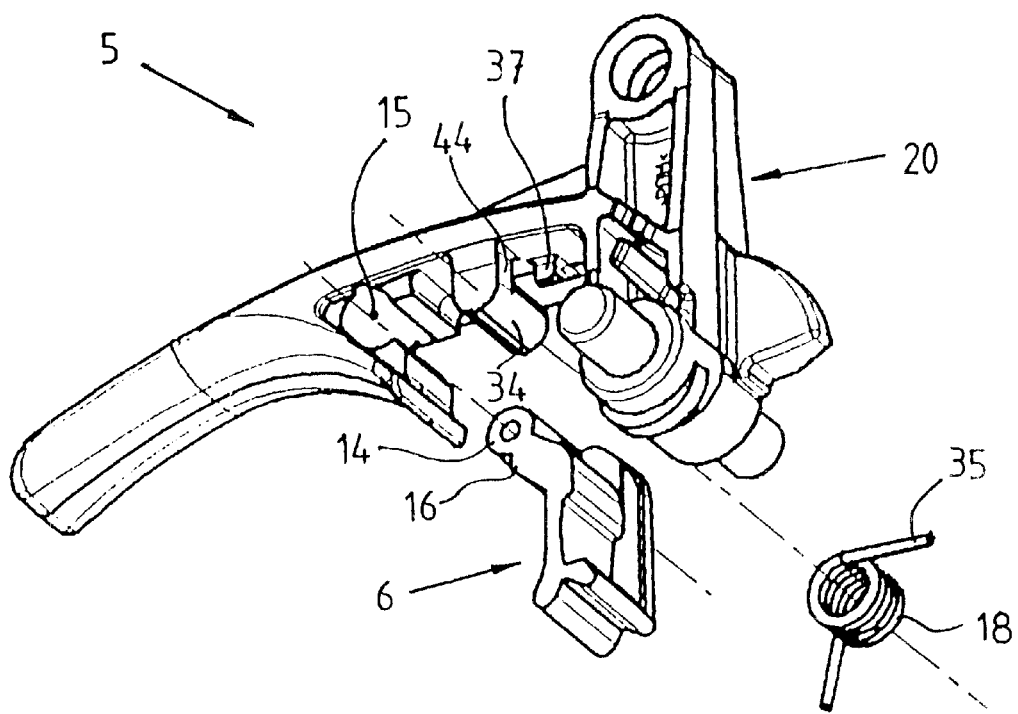
FIG. 11 is an exploded view of the gas throttle in a view similar to that of FIG. 10.

The gas throttle 5 is held in the idling position shown in FIG. 2 by means of a non-illustrated return spring. In this connection, the butterfly valve 29 is disposed in an idling setting in which the intake channel portion 31 of the carburetor 8 is to a large extent closed off. The gas throttle 5 has an essentially T-shaped configuration. The arresting element 6 is fixed in position on the long leg 21 of the gas throttle 5 by means of a pivot joint 9, the construction of which will be described in greater detail in conjunction with FIGS. 6 and 11. The arresting element 6 is held in a position of rest against a stop 30 on the grip portion 11 of the throttle 5 by means of a spring element 10, which in the illustrated embodiment is a torsion spring 18. This torsion spring is mounted on the throttle 5 and is supported between the throttle and the arresting element 6.

Figure 3:
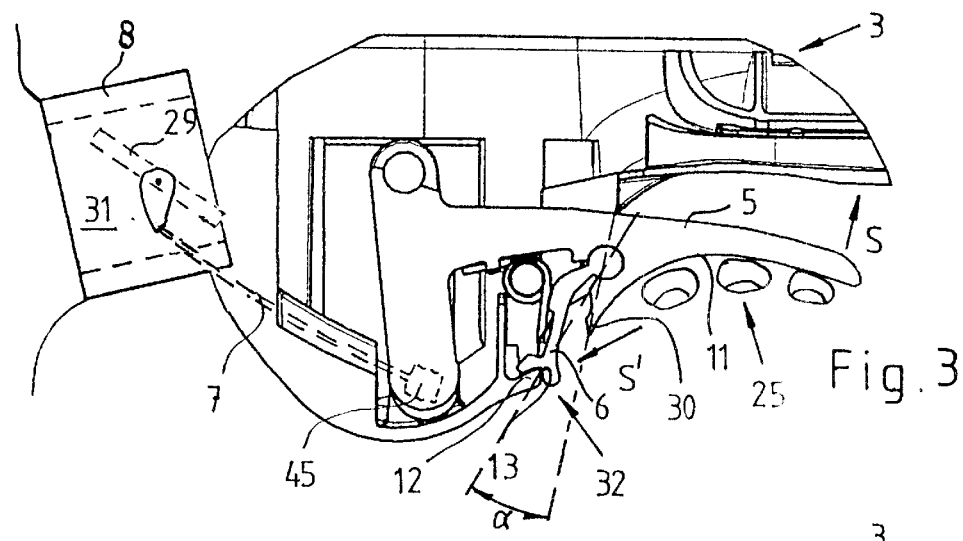
FIG. 3 is a view similar to that of FIG. 2 showing the gas throttle in the starting position due to the arresting element.

The side view of FIG. 3 shows the gas throttle 5 in a starting position. The butterfly valve 29 in the intake channel portion 31 of the carburetor 8 is disposed in a partially open throttle position and partially releases the intake channel portion. For this purpose, the gas throttle 5 was moved by the fingers of the hand 25 of the user 24 in the direction of the arrow S toward the grip 3, and the arresting element 6 was pivoted in the direction of the arrow S' by a finger of the hand 25. The free end 32 of the arresting element 6 has a forked configuration to form an arresting recess 13, which is brought into engagement with a detent 12 on the grip 3. The arresting element 6 is now in the structurally provided arresting position. In the illustrated embodiment, the arresting element is pivoted by an angular amount a of about 20° in the direction of the arrow S' from the stop 30 on the grip portion 11 of the gas throttle 5, and holds the throttle in a partially pressed in position, as viewed in the direction of the arrow S, which corresponds to the starting throttle position of the gas throttle 5.

Figure 4:
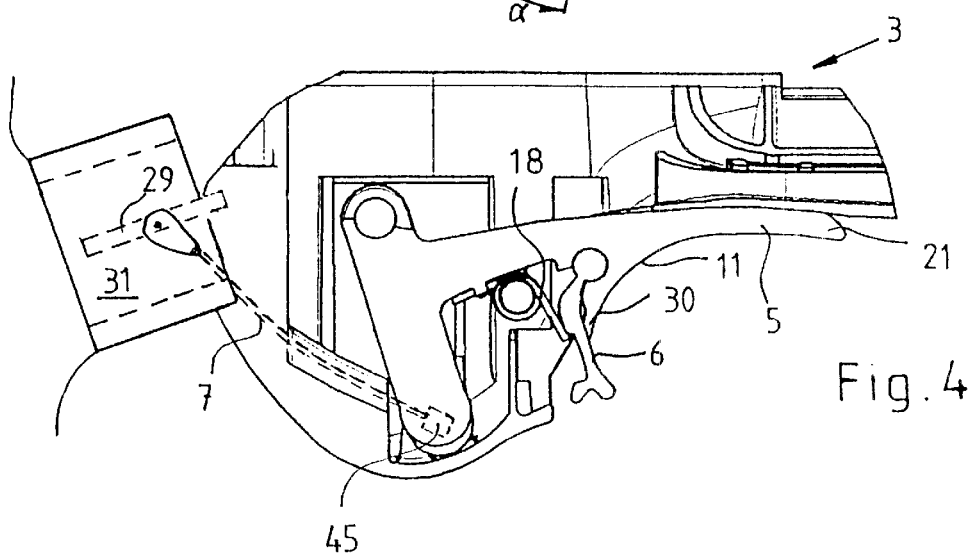
FIG. 4 is a side view similar to that of FIG. 2 showing the gas throttle in the full throttle position.

The side view of FIG. 4 shows the gas lever 5 in a full throttle or power position. The long leg 21 of the throttle 5 abuts the grip 3, for which purpose the throttle is pressed in further in the direction of the arrow S (see FIG. 3). The butterfly valve 29 completely releases the intake channel portion 31. The arresting element 6 is released, and is pivoted back by the torsion spring 18 into the rest position against the stop 30 on the grip portion 11 of the throttle 5.

Figure 5:
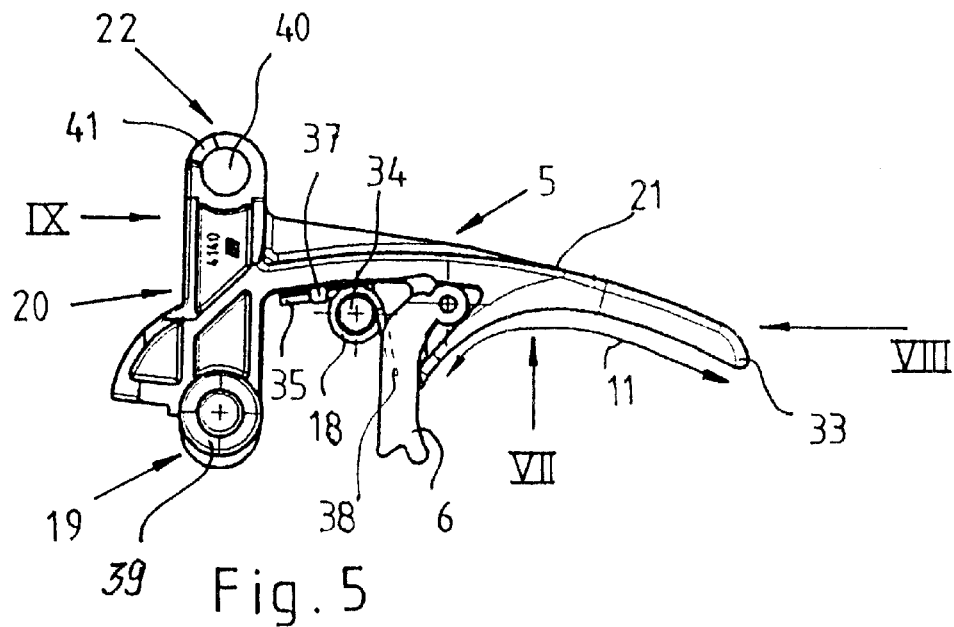
FIG. 5 is a side view of the gas throttle of FIG. 2.

FIG. 5 is a side view of the gas throttle 5 from the opposite side of that shown in FIGS. 2 to 4. The essentially T-shaped configuration of the throttle 5 includes a short leg 20, from which the long leg 21 projects at approximately right angles. The gas throttle 5 has a monolithic construction. That end 33 of the long leg 21 that faces away from the short leg 20 has a parabolic shape to form the grip portion 11. During operation of the manually guided implement, the fingers of that hand used for adjusting the speed of the drive motor rest on the grip portion 11. The contour of the arresting element 6, facing the short leg 20 of the throttle 5, borders the contour of the grip portion 11. The arresting element 6 is shown in its position of rest and projects approximately at right angles from the middle of the long leg 21 of the gas throttle 5. Between the arresting element 6 and the short leg 20, the torsion spring 18 is placed about a pin 34 of the gas throttle 5 on the long leg 21 thereof. One end 35 of the torsion spring 18 rests against a nose-like projection 37 of the gas throttle 5, while the other end 38 of the torsion spring 18 presses the latter against the arresting element 6. To rotatably mount the throttle 5 on the grip of the manually guided implement, two bearing pins 39 are monolithically formed on the end 19 of the short leg 20. An eye 40 having a radial slit 41 is provided on that end 22 of the short leg 20 that is disposed opposite the end 19 thereof. During assembly of the gas throttle, an end fitting 45 (see FIGS. 3 and 4) of the transmitting means 7—especially a Bowden cable—is mounted in the eye 40, whereby by means of the transmitting means 7 the control or adjustment movement of the gas throttle is transmitted to the butterfly valve of the carburetor of the drive rotor.

Figure 6:
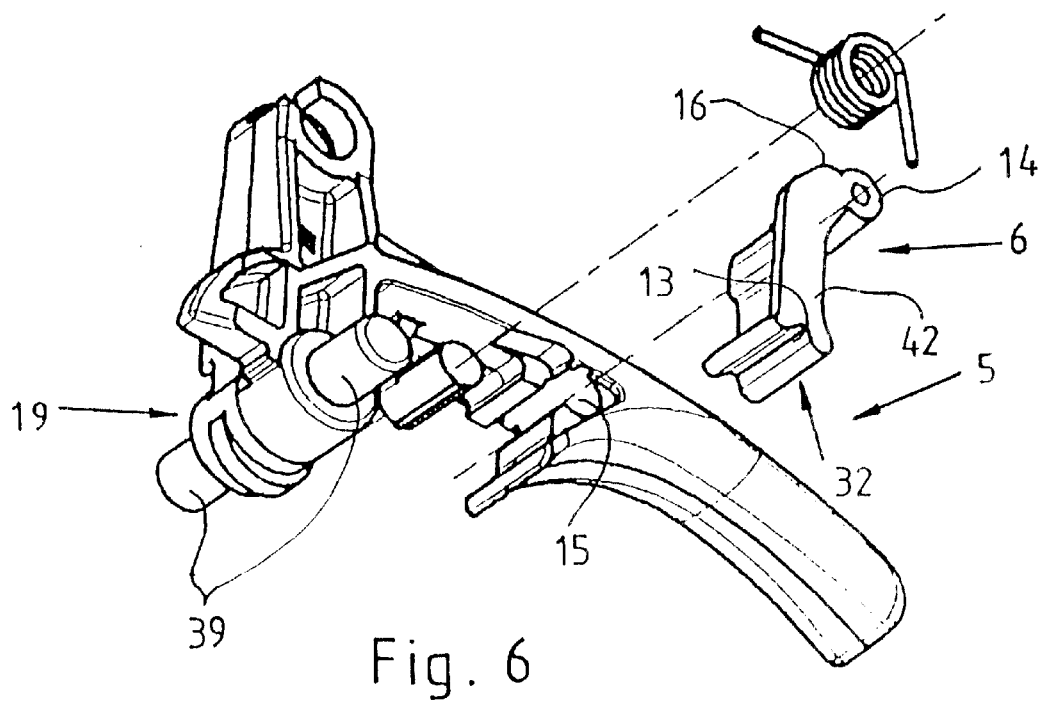
FIG. 6 is an exploded view of the gas throttle of FIG. 5.
Figure 7:
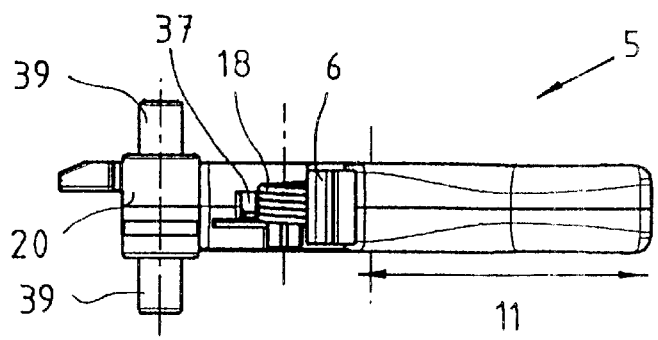
FIG. 7 is a view of the gas throttle taken in the direction of the arrow VII in FIG. 5.

FIG. 6 is an exploded view of the gas throttle 5 of FIG. 5. As can be clearly seen, the edges of the grip portion are rounded. When viewed in a cross section and a longitudinal section, the arresting element 6 has an approximately L-shaped configuration with a flat side surface 42. The end 32 of the arresting element has the aforementioned fork-shaped configuration and forms the arresting recess 13, while the opposite end is embodied as a cylindrical bolt 14. This bolt 14 is insertable into a semi-cylindrical socket 15 on the gas throttle 5. When viewed in cross section, the socket 15 spans an arc segment of more than 280°, so that the bolt 14 is held therein in such a way that it cannot fall out radially. To axially secure the arresting element 6 in the socket 15, tooth-like detents 16 are formed on both sides of the arresting element; in an assembly position of the arresting element 6, these detents 16 are not in engagement with the socket 15. However, in the rest and arresting position of the arresting element 6 on the gas throttle 5, the detents 16 engage side surfaces of the socket 15. As a consequence of these structural features, during operation of the manually guided implement the arresting element 6 is axially secured without the necessity for additional securement elements on the gas throttle 5 (see FIGS. 6, 10 and 11).

Figure 8:
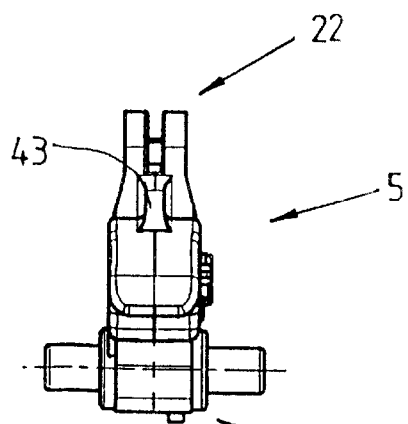
FIG. 8 is a view of the gas throttle taken in the direction of the arrow VIII in FIG. 5.

In the view of FIG. 6, it can be seen that the gas throttle 5 is a bar-like component having a length that is approximately six times the width of the throttle. The cylindrical pins 39 project from both sides of the short leg 20. On that side facing away from the arresting element 6, a wedge-shaped reinforcing rib 43 is raised approximately over the length of the grip portion 11 of the gas throttle 5; this reinforcing rib 43 extends to the short leg 20 of the throttle 5 (see FIGS. 8 and 10).

Figure 9:
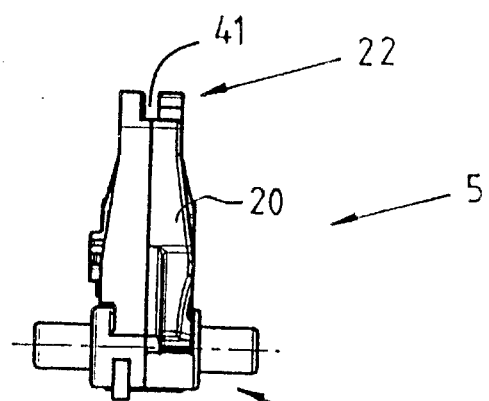
FIG. 9 is a view of the gas throttle taken in the direction of the arrow IX in FIG. 5.

From FIG. 9 it can be seen that the short leg 20 of the gas throttle 5 has approximately half the length of the long leg.

Figure 10:
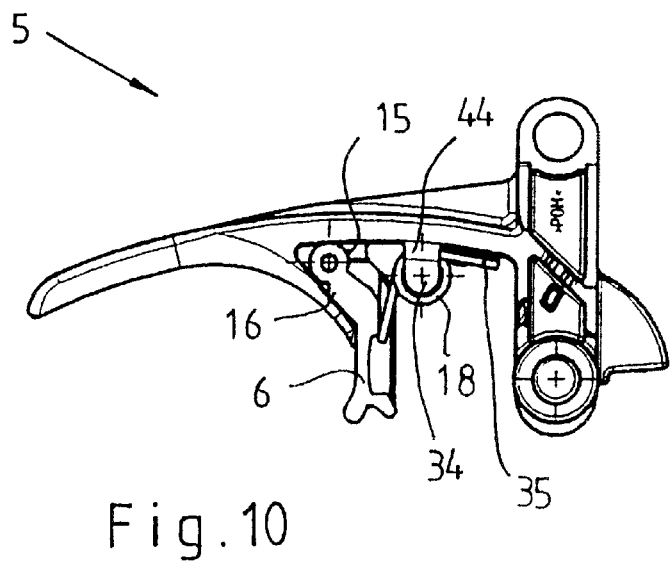
FIG. 10 is a further side view of the gas throttle of FIG. 5.

The side view of FIG. 10 shows, among other things, the detents 16 that are provided on the arresting element 6 for axially securing the arresting element against the side surfaces of the socket 15. The torsion spring 18 is axially held on the pin 34 of the gas throttle 5, whereby one end of the pin 34 is fixed in position on the gas throttle 5 via an integrally formed retaining tab or tongue 44. On the opposite side of the retaining tongue 44, the end 35 of the torsion spring 18 is brought into abutment against the projection 37 and is thereby axially secured (see FIG. 11).

The arresting element 6 and gas throttle 5 are injection molded plastic parts, whereby the throttle 5, and in particular the short leg 20 thereof, is appropriately webbed in order to minimize weight and save material. As a consequence of the assembled unity of the gas throttle 5 with the arresting element 6, and the compact construction, a universal use is possible in many types of motor-driven implements.

The specification incorporates by reference the disclosure of German priority document 200 06 073.2 of Apr. 1, 2000.

The present invention is, of course, in no way restricted to the specific disclosure of the specification and drawings, but also encompasses any modifications within the scope of the appended claims.

What I claim is:

1. A manually guided implement having a drive motor, and a grip for guiding the implement, wherein a gas throttle is pivotably mounted on the grip and is connected by a transmitting means to a carburetor of the drive motor, said implement further comprising:

an arresting element that is a separate component but is held on said gas throttle, said arresting element serving for releaseable arresting of said gas throttle relative to said grip;

a pivot joint for a pivotable mounting of said arresting element on said gas throttle; and a spring element for holding said arresting element in a position of rest on said gas throttle.

2. A implement according to claim 1, wherein said arresting element is disposed in an extension of a grip portion of said gas throttle, and wherein said arresting element is arrestable in an arresting position on said grip.

3. A implement according to claim 2, wherein in said resting position of said arresting element, said gas throttle is held in a starting throttle position.

4. A implement according to claim 2, wherein in said arresting position of said arresting element a detent of said grip engages in an arresting recess of said arresting element.

5. A implement according to claim 1, wherein said pivot joint comprises a bolt of said arresting element that engages in a partial cylindrical socket of said gas throttle.

6. A implement according to claim 5, wherein said arresting element has formed thereon at least one detent for axially securing said arresting element on said gas throttle.

7. A implement according to claim 1, wherein said pivot joint is embodied as a film articulation.

8. A implement according to claim 1, wherein said spring element is a torsion spring that is held on said gas throttle.

9. A implement according to claim 1, wherein said gas throttle has an essentially T-shaped configuration, including a longer leg that forms a rib portion, and a shorter leg, one end of which forms part of a pivot joint for a pivotable mounting of said gas throttle on said grip, while another end of said short leg engages said transmitting means to a carburetor.

10. A implement according to claim 1, wherein said gas throttle and said arresting element are injection molded plastic parts.

* * * * *